(12) United States Patent
Sun et al.

(10) Patent No.: US 8,644,269 B2
(45) Date of Patent: *Feb. 4, 2014

(54) ADAPTIVE TRANSMISSIONS IN WIRELESS NETWORKS

(75) Inventors: Yanjun Sun, Richardson, TX (US); Ariton E. Xhafa, Plano, TX (US); Xiaolin Lu, Plano, TX (US); Josef Peery, Ra'anana (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,659

(22) Filed: Aug. 21, 2012

(65) Prior Publication Data

US 2012/0314661 A1 Dec. 13, 2012

Related U.S. Application Data

(62) Division of application No. 12/568,956, filed on Sep. 29, 2009, now Pat. No. 8,270,378.

(60) Provisional application No. 61/102,486, filed on Oct. 3, 2008.

(51) Int. Cl.
*H04W 74/04* (2009.01)

(52) U.S. Cl.
USPC ........... 370/336; 370/328; 370/348; 370/346; 370/331; 370/468

(58) Field of Classification Search
USPC ......... 370/336, 346, 468, 331, 229, 389, 394, 370/252
See application file for complete search history.

(56) References Cited

U.S. PATENT DOCUMENTS

| 5,231,634 | A | * | 7/1993 | Giles et al. | 370/348 |
|---|---|---|---|---|---|
| 7,215,962 | B2 | * | 5/2007 | Faerber | 455/437 |
| 7,529,560 | B2 | * | 5/2009 | Nielsen et al. | 455/552.1 |
| 8,054,802 | B2 | * | 11/2011 | Burgess et al. | 370/331 |
| 2004/0156339 | A1 | * | 8/2004 | Urquhart et al. | 370/334 |
| 2005/0141545 | A1 | * | 6/2005 | Fein et al. | 370/445 |
| 2007/0129045 | A1 | * | 6/2007 | Aerrabotu | 455/343.5 |

* cited by examiner

*Primary Examiner* — Rasheed Gidado
(74) *Attorney, Agent, or Firm* — Steven A. Shaw; Wade James Brady, III; Frederick J. Telecky, Jr.

(57) ABSTRACT

A network includes an access point using a first protocol and a station using both the first protocol and a second protocol. The station uses the first protocol before a first threshold and a second protocol after the first threshold. A first duration between the second threshold and the first threshold is at least of sufficient length for the station to receive one data packet from the access point and send an acknowledgment. The station transmits to the access point a current clear-to-send packet at a current time during a current exchange based on success or failure of a previous exchange during which a previous clear-to-send packet was transmitted to the access point at a previous time.

13 Claims, 6 Drawing Sheets

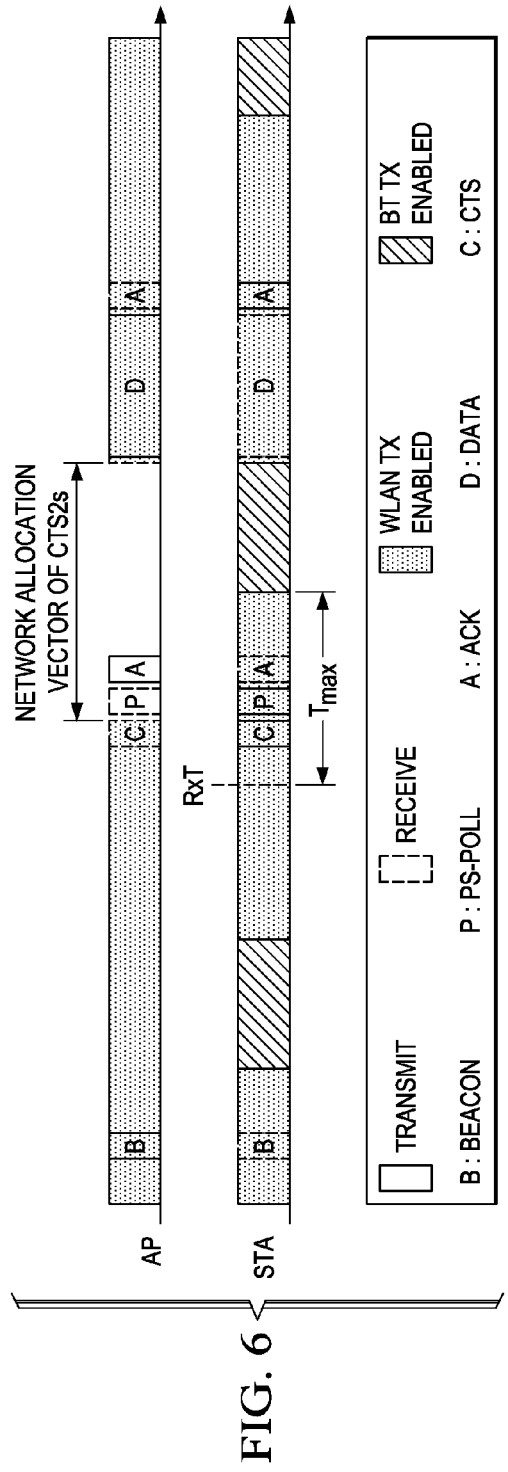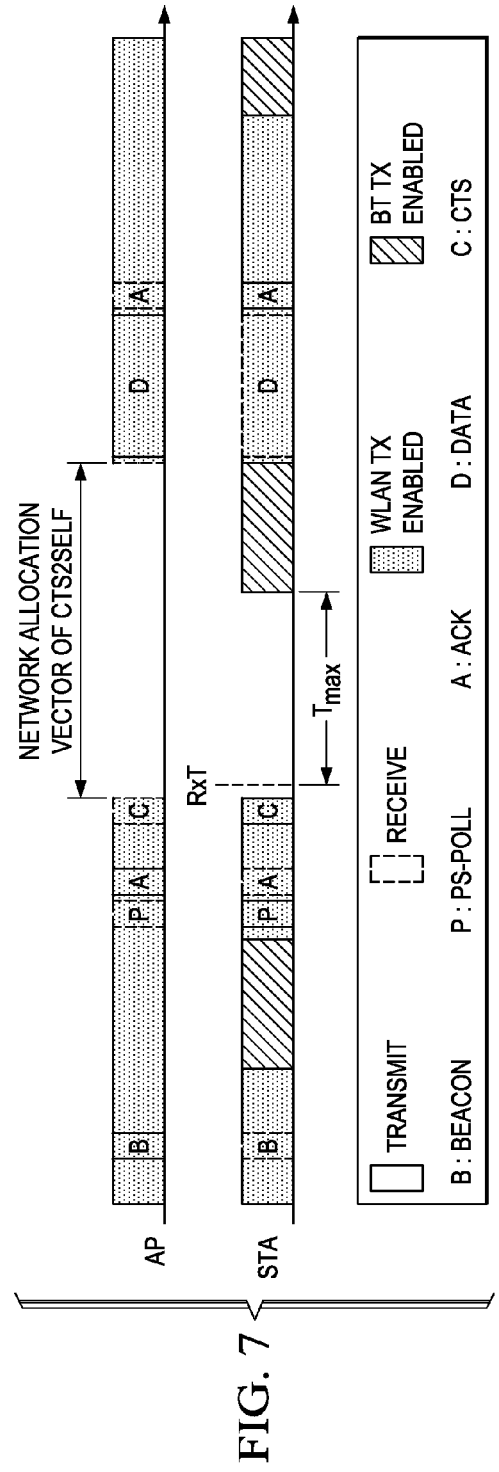

ADAPTIVE TRANSMISSIONS IN WIRELESS NETWORKS

CROSS-REFERENCE TO RELATED APPLICATIONS

This application is a non-provisional application claiming priority to U.S. patent application Ser. No. 12/568,956 filed on Sep. 29, 2009 which claims priority to U.S. Provisional Application Ser. No. 61/102,486, filed on Oct. 3, 2008, entitled "Adaptive Scheduling of PS-Poll and CTS2SELF Transmissions in Coexisting Wireless Networks," the teachings of which are incorporated by reference herein.

BACKGROUND

The interference of protocols operating in the same wireless mediums, and even on the same wireless device, creates coexistence challenges. Specifically, the out-of-band emission by transceiver may saturate another transceiver (starvation) and blocking may occur (avalanching).

BRIEF DESCRIPTION OF THE DRAWINGS

For a more complete understanding of the present disclosure, reference is now made to the accompanying drawings and detailed description, wherein like reference numerals represent like parts:

FIGS. 2-7 each illustrate a timing diagram in accordance with at least some illustrative embodiments;

NOTATION AND NOMENCLATURE

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and the term may be used to refer to an electronic device or a combination of electronic devices.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one having ordinary skill in the art will understand that the following description has broad application, and the discussion of any embodiment is meant only to be exemplary of that embodiment, and not intended to intimate that the scope of the disclosure, including the claims, is limited to that embodiment.

Most mobile devices are equipped with BLUETOOTH, which enables easy access to the mobile devices. Besides BLUETOOTH, many mobile devices are also able to access WLAN networks, WiMAX networks, 3GPP cellular networks, etc. While such coexistence of protocols will benefit users and operators alike, interferences between different technologies make optimum simultaneous operations of these technologies difficult.

Figure 1:
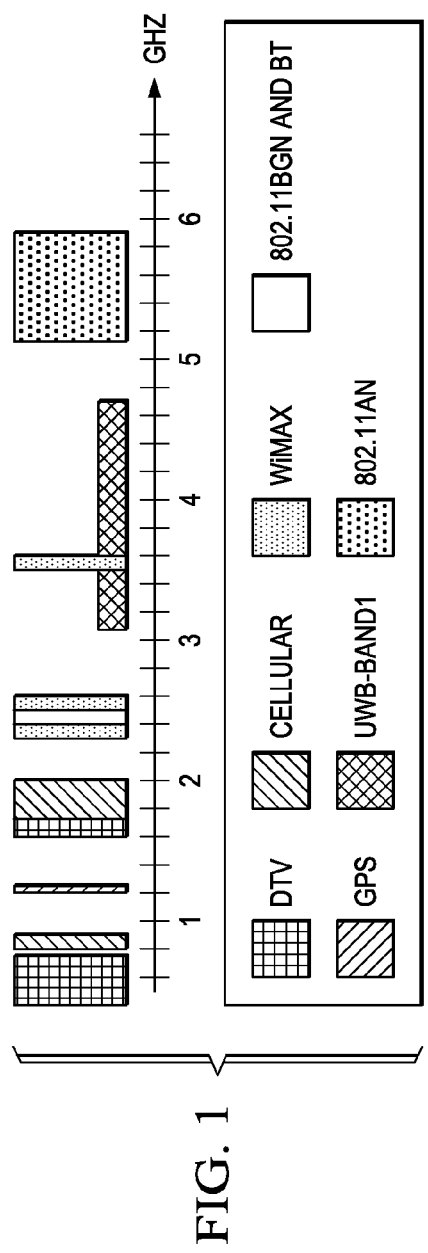
FIG. 1 illustrates different technologies and their operating bands in accordance with at least some illustrative embodiments.

As shown in FIG. 1, BLUETOOTH ("BT") and WLAN (in 2.4-2.5 GHz) operate at close or even similar frequency bands. Therefore, coexistence of these protocols in the same device creates conflict challenges. Specifically, out-of-band emission by either protocol's radio may saturate the receiver of the other's radio. For clarity, discussion will be in the context of BT and WLAN coexistence; however, use of any kind and any number of communication protocols, including those represented in FIG. 1, is within the scope of this disclosure.

WiMAX, short for Worldwide Interoperability for Microwave Access, is a telecommunications technology that provides wireless transmission of data using a variety of transmission modes, from point-to-multipoint links to portable and fully mobile internet access.

A WLAN, short for wireless local area network, links two or more computers or devices using spread-spectrum or OFDM, short for orthogonal frequency-division multiplexing, modulation technology to enable communication between devices in a limited area. This technology gives users the mobility to move around within a broad coverage area and still be connected to the network.

BLUETOOTH uses a radio technology called frequency-hopping spread spectrum, which chops up the data being sent and transmits chunks of data over up to 79 frequencies. In its basic mode, the modulation is Gaussian frequency-shift keying ("GFSK").

Ultra-wideband (aka UWB, ultra-wide band, ultraband, etc.) is a radio technology that can be used at very low energy levels for short-range high-bandwidth communications by using a large portion of the radio spectrum.

The Global Positioning System (GPS) is a U.S. space-based global navigation satellite system.

All cellular phone networks worldwide use a portion of the radio frequency spectrum designated as Ultra High Frequency, or "UHF," for the transmission and reception of signals. The UHF band is also shared with television, Wi-Fi, and BLUETOOTH transmission. The cellular frequencies are the sets of frequency ranges within the UHF band that have been allocated for cellular phone use.

IEEE 802.11 is a set of standards carrying out wireless local area network (WLAN) computer communication in the 2.4, 3.6, and 5 GHz frequency bands.

A station ("STA") is any device that contains a medium access control ("MAC") and physical layer ("PHY") interface to a wireless medium. An access point ("AP") is any entity that has STA functionality and provides access to distribution services via the wireless medium for associated STAs. STAs and APs can be readily interchanged in many circumstances. The STA and AP communicate by sending packets to each other. Many types of packets can be sent including the following.

Acknowledgement packet ("ACK"): After receiving a data packet, the receiving STA will send an ACK to the sending STA if no errors are found. If the sending STA does not receive an ACK within a predetermined period, the sending STA will resend the data packet.

Request-to-Send packet ("RTS"): The RTS provides an optional collision reduction scheme. A STA sends a RTS to as the first step in a two-way handshake required before sending data packets. The RTS provides collision control management by including a time value (network allocation vector or "NAV") for a duration in which all other STAs are to hold transmissions.

Clear-to-Send packet or Clear-to-Send-to-Self packet ("CTS"): A STA responds to a RTS with a CTS. It provides clearance for the requesting STA to send a data packet. The CTS provides collision control management by including a time value (network allocation vector or "NAV") for a duration in which all other STAs are to hold transmissions.

Data packet: Data packets move information from one point to another using the packet payload to store information. Different types of data packets contain different quality of service subfields.

Poll packet: Upon determining that a data packet is currently buffered in the AP, a STA operating in power-save mode transmits a short poll to the AP, which responds with the corresponding buffered data packet or an ACK. If an ACK is sent, the AP responds with the corresponding data packet at a later time.

Beacon packet ("Beacon"): Beacons are management packets that contain critical network information such as a beacon interval, timestamp, service set identifier, supported rates, parameter sets, capability information, and a traffic indication map.

Short Interframe Space ("SIFS"): SIFS is the small gap between the data packet and its acknowledgment. SIFS are found in IEEE 802.11 networks. They are used for the highest priority transmissions, and enable STAs with this type of information to access the radio link first. Examples of information that will be transmitted after the SIFS has expired include ACKs, and CTSs.

Avalanching occurs when a mobile device is transmitting via a first network (e.g., Bluetooth) when another network device transmits a packet to the mobile device via a second network (e.g., a WLAN). The mobile device will be unable to transmit an acknowledge signal because channel access is reserved for transmission via the first network. Consequently, the device transmitting via the second network may conclude that the packet was lost and reduce the transmission rate of subsequent packets. The longer transmission interval resulting from the reduced rate may further increase the number of collisions with transmissions via the first network at the mobile device, ultimately resulting in progressive performance degradation (i.e., an avalanche effect).

Figure 2:
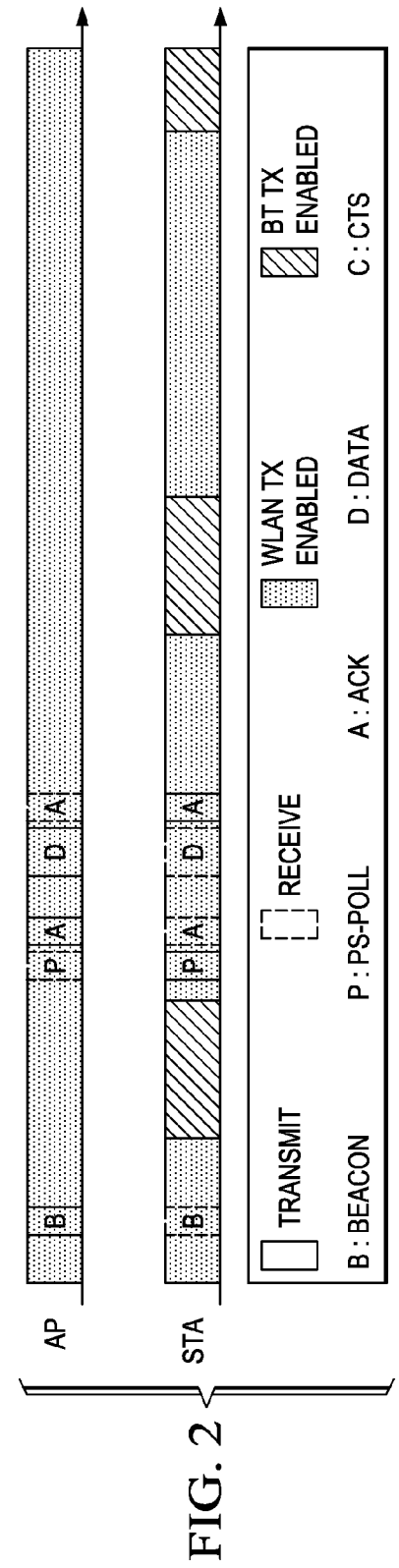

FIG. 2 illustrates packet transmission. The STA is a coexistence device switching between periods of WLAN operability and BT operability. For clarity, discussion will be in the context of BT and WLAN coexistence; however, use of any kind and any number of communication protocols, including those represented in FIG. 1, is within the scope of this disclosure. The AP uses only WLAN. The STA receives a beacon indicating a pending data packet for the STA at the AP. After the BT duration, the STA transmits a poll to notify the AP that the STA is active to receive the data. Preferably, the AP cannot send any data before first received a poll. Upon receiving this poll, the AP replies with an ACK after a SIFS delay. The data packet is sent, and the STA confirms a successful receipt with an ACK. In some embodiments, the AP replies to the poll with the data packet instead of the ACK. Because the AP is restricted from transmitting any data before receiving a poll from the STA, no CTS is needed, and avalanching is avoided.

Figure 3:
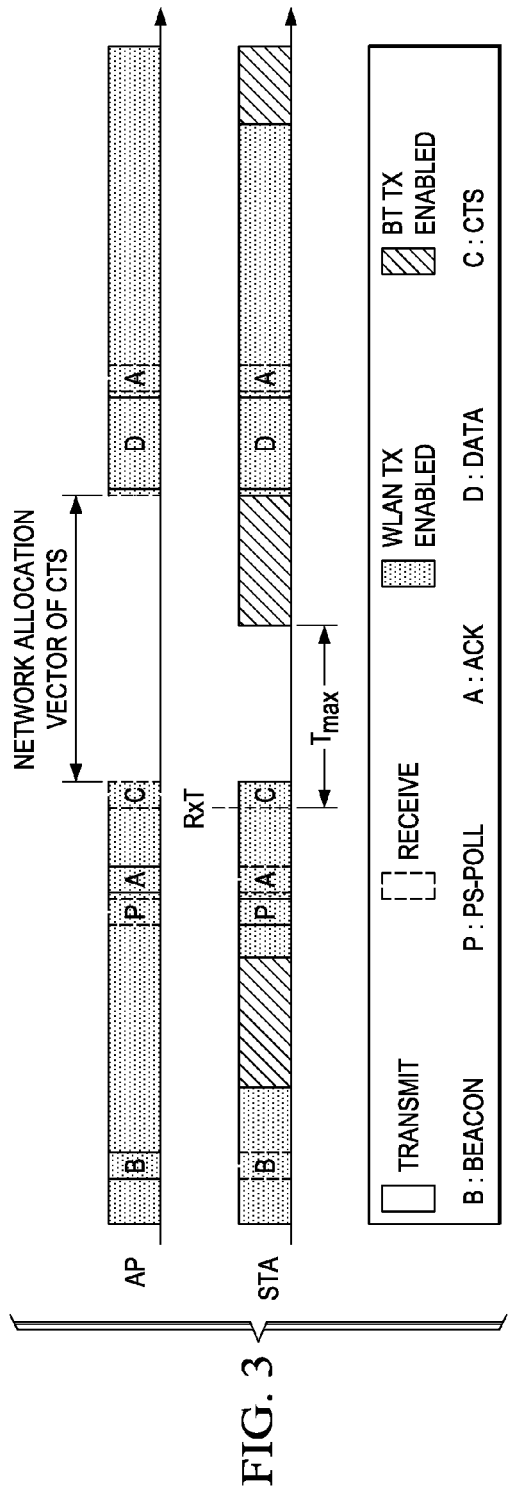

However, FIG. 3 illustrates a scenario where the AP does not send the data packet in time. Specifically, transmission of a data packet from the AP to the coexistence node could overlap with the second duration of BT activity. Such overlap could lead to packet drops or avalanching. To avoid this problem, the coexistence node generates a CTS in order to delay the data transmission until after the BT activity. Specifically, the NAV of the CTS specifies the duration from receipt of the CTS to the end of the next BT duration. The AP sets its NAV counter based on the CTS, and the AP decrements its NAV counter until the counter reaches zero, at which time the STA will begin use WLAN for communication again. As such, the AP can freely send the data packet without collision, blocking, or transmission during BT activity.

The CTS is transmitted after a reception threshold, RxT. The duration between RxT and the beginning of the next BT duration is Tmax. Tmax is long enough for the STA to receive one data packet from the AP and return an ACK. When the data transmission rate from the AP to the STA varies, Tmax and RxT vary accordingly.

Figure 4:
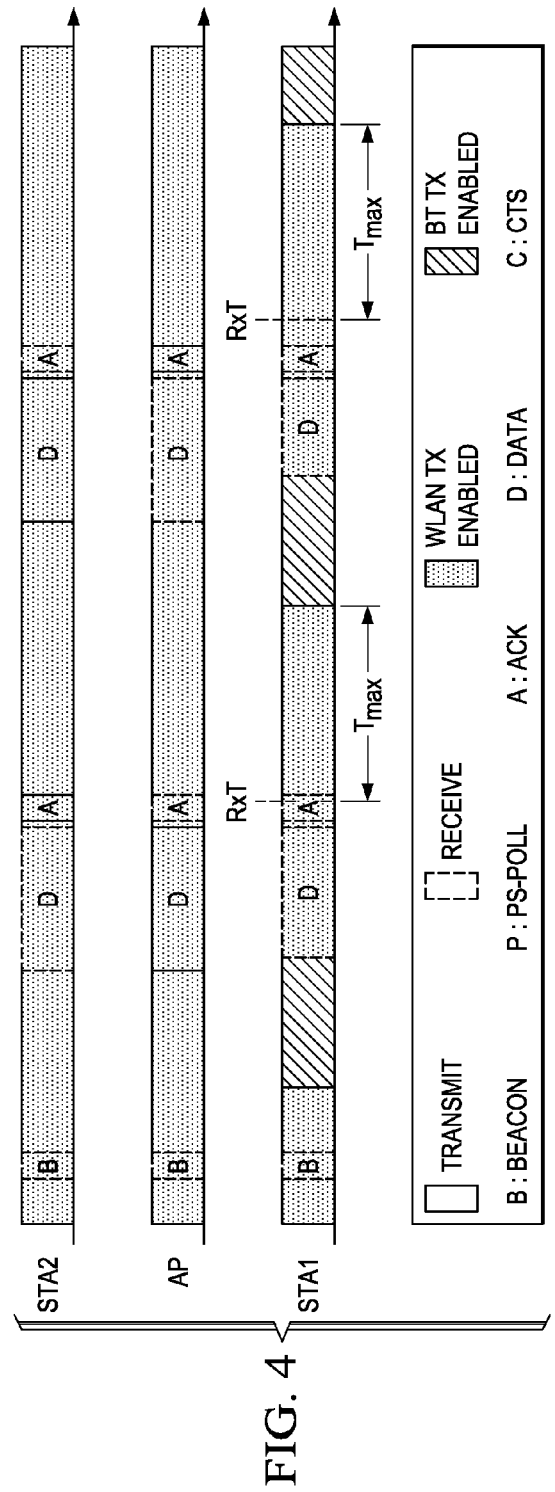

However, scheduling of CTS transmissions based on RxT could lead to starvation and avalanching at the STA when there are transmissions with other STAs in the same network. FIG. 4 illustrates a scenario in which poll transmission from STA1 cannot begin due to transmissions from STA2, which is not a coexistence STA, and a large Tmax. Because STA1 does not utilize WLAN during BT activity, STA2 and AP are likely to use that time to transmit. As shown, the first data-ACK exchange between the AP and STA2 extends beyond first RxT, thus disallowing a poll to be transmitted by STA1. During the second data-ACK exchange, the gap between the end of the ACK and the second RxT is too small. As such, the poll will not be transmitted here either, and STA1 could experience starvation.

Figure 5:
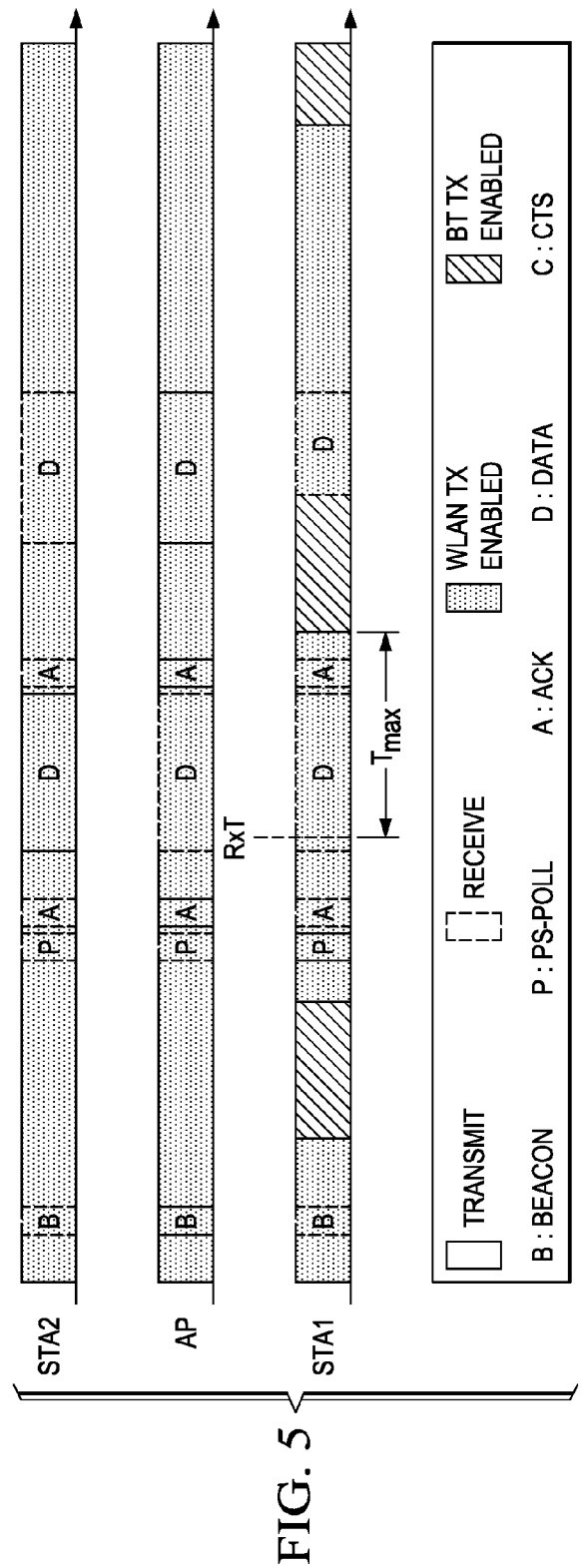

STA1 can still suffer from neighbor transmissions even after successfully transmitting a poll. Most APs cannot start data transmission immediately after sending an ACK in response to the received poll. There is often a delay of several hundreds of microseconds before an AP starts the transmission. This delay allows a transmission to start from STA2 in FIG. 5. Because the transmission of the data packet from STA2 occupies most of Tmax, STA1 cannot transmit a CTS in time to delay the data transmission from the AP. As such, the AP transmits the beginning of the data packet during the end of BT activity, preventing STA1 from correctly receiving the data packet. Without receiving an ACK from STA1, AP will retry sending the data packet. The retry may itself suffer from collision or blocking, which may cause other packets to be retried, leading to an avalanche of dropped packets.

Preferably, the STA and AP are configured such that the AP cannot transmit a data packet to the STA without having received a poll from the STA first. In the event that neither an ACK nor a data packet is received from the AP in response to a poll, the STA retries the sequence by transmitting another poll. If the AP sends a data packet in response to a poll, but fails to receive the ACK acknowledging this data packet, the next poll from the same STA preferably causes a retransmission of the last data packet. If the AP responds to a poll by transmitting an ACK, then responsibility for the data packet delivery error recovery shifts to the AP because the data packet is transferred in a subsequent packet exchange sequence, which is initiated by the AP.

The protection mechanism using CTSs, however, could greatly reduce the channel utilization because a CTS disables transmissions from all WLAN neighbors during not only the following BT activity, but a large portion of Tmax. For example, when the BT radio has voice traffic carried via synchronized connection packets HV3, a co-existence node generates a CTS once every 3.75 ms, resulting in a channel utilization of less than 67% because transmissions from neighbors are disabled for at least 1.25 ms. Channel utilization could be worse when CTS based protection is used by multiple mobile devices associated with the same AP.

As such, transmissions are allowed if there is enough time to transmit a CTS and the poll-ACK handshake as illustrated in FIG. 6. If a CTS is sent after RxT, then poll-ACK exchange follows after RxT but before the BT activity. In various embodiments, the exchange occurs during the NAV of the CTS. In a crowded network, the chance that a coexistence node wins the medium is increased when Tmax is large due to a low data transmission rate. As such, starvation and avalanching are avoided. When the BT activity ends, as indicated by the NAV, the AP sends the data packet and the STA responds with an ACK.

Additionally, the transmission time of the CTS is allowed to be adjusted. Preferably, the threshold to begin transmission of the CTS is defined as (RxT−x). If a failed CTS transmission from a previous exchange leads to a retransmission in the current exchange, x is increased exponentially. If the CTS transmission from a precious exchange was successful, x is decreased linearly for the current exchange. If (RxT−x) is earlier than poll transmission, a CTS is transmitted SIFS time after the ACK sent in response to the poll as illustrated in FIG. 7. If there is no previous exchange data, the CTS is transmitted at RxT. In this way, CTS transmission adapts to traffic loads in a WLAN automatically, and starvation and avalanching are avoided.

Figure 8:
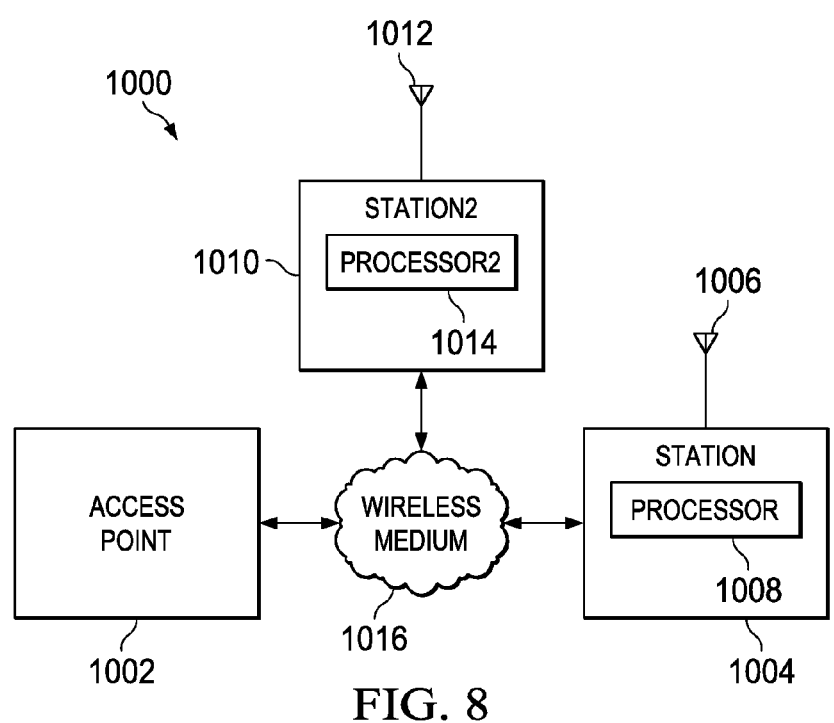
FIG. 8 illustrates network in accordance with at least some illustrative embodiments.

FIG. 8 illustrates a network 1000 comprising an AP 1002 and a STA 1004. Communication between the STA 1004 and the AP 1002 occurs in a first protocol. The STA 1004 also communicates using a second protocol. The STA 1004 uses the first protocol before a first threshold and a second protocol after the first threshold, e.g., the first threshold is the beginning of BT activity. The second threshold is before the first threshold, e.g., the second threshold is RxT. A first duration between the second threshold and the first threshold is at least of sufficient length for the STA 1004 to receive one data packet from the AP 1002 and send an acknowledgment, e.g., the first duration is Tmax. The AP 1002 is unable to transmit data packets to the STA 1004 without receiving a poll, e.g., power save rules are applied. Preferably, the STA 1004 transmits the poll to the AP 1002 during the first duration. If the poll is transmitted before the second threshold, the STA 1004 transmits the current clear-to-send packet slightly before the second threshold, e.g. before RxT.

As explained above, the STA 1004 transmits, to the AP 1002, a current clear-to-send packet at a current time during a current exchange based on success or failure of a previous exchange during which a previous clear-to-send packet was transmitted, to the AP 1002, at a previous time. If the previous exchange was successful, the current time is later in the current exchange relative to the previous time in the previous exchange by a linear amount. If the previous exchange failed, the current time is earlier in the current exchange relative to the previous time in the previous exchange by an exponential amount. If there is no previous transmission, the STA 1004 transmits the current clear-to-send packet at the second threshold.

The STA transmits the current clear-to-send packet, before transmitting the poll, during the first duration. The STA 1004 receives an acknowledgement to the poll during the first duration. A network allocation vector period of the current clear-to-send packet expires at a third threshold before which the STA 1004 uses the second protocol and after which the STA uses the first protocol, e.g., the third threshold is at the end of BT activity. The third threshold is preferably after the first threshold.

The AP 1002 transmits a beacon to the STA 1004, the beacon indicating a data packet is available, and the AP 1002 transmits the data packet after the third threshold. In at least some embodiments, the poll and the acknowledgement to the poll are sent during the network allocation vector period. In at least one embodiment, the first protocol is WLAN and the second protocol is BLUETOOTH.

Figure 9:
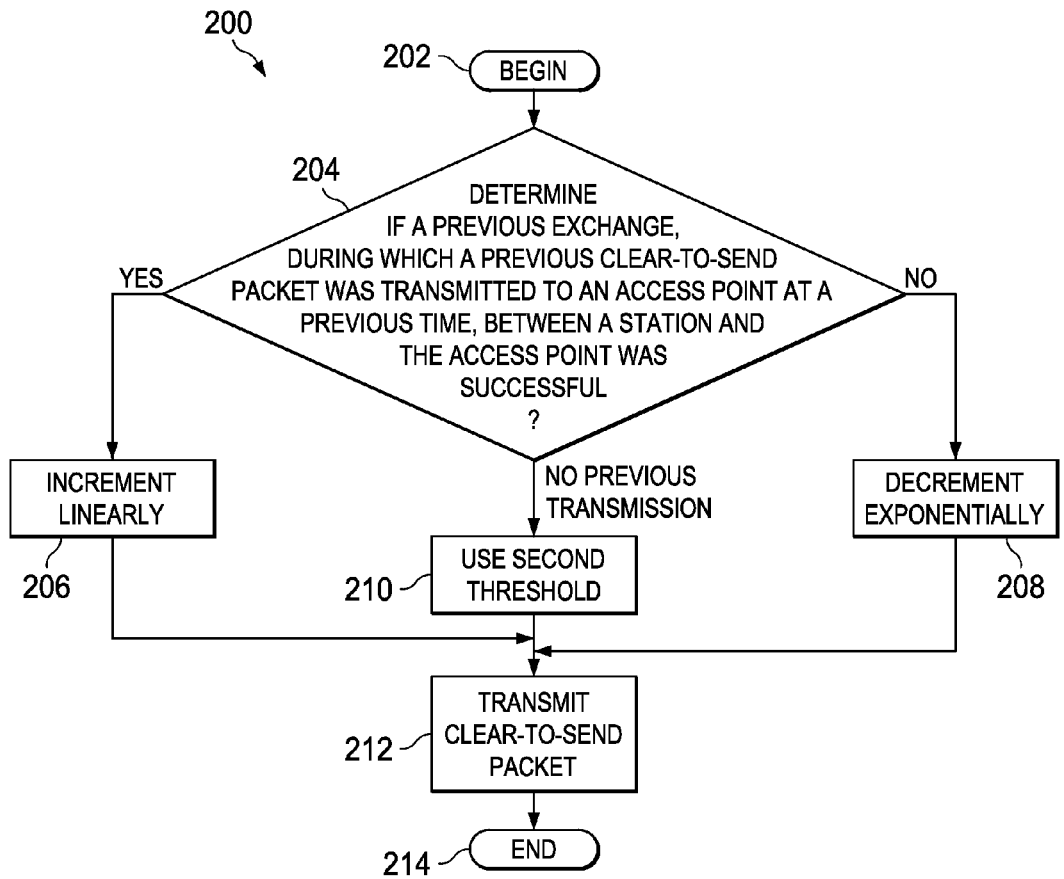
FIG. 9 illustrates a method of scheduling transmissions in accordance with at least some illustrative embodiments.

FIG. 9 illustrates a method 200 beginning at 202 and ending at 214. At 204, the success of a previous exchange is determined. Specifically, if the previous exchange comprised successful transmission of a previous clear-to-send packet to an AP at a previous time between a STA and the AP. Determination of successful or failure of previous exchange can be done for example, by listening to the medium in the first protocol before switching to the second protocol. Preferably, communication between the STA and the AP occurs in a first protocol, and the AP is unable to transmit data packets to the STA without receiving a poll. The STA also preferably communicates using a second protocol. The STA uses the first protocol before a first threshold and the second protocol after the first threshold, and the second threshold is before the first threshold. A first duration between the second threshold and the first threshold is at least of sufficient length for the STA to receive one data packet from the AP and send an acknowledgment. For example, the second threshold is RxT, and the first duration is Tmax.

At 206, if the previous exchange was successful, the current time is determined to be later in the current exchange relative to the previous time in the previous exchange by a linear amount. At 208, if the previous exchange failed, the current time is determined to be earlier in the current exchange relative to the previous time in the previous exchange by an exponential amount.

At 210, if there is no previous transmission, the second threshold is used as the current time. At 212, a current clear-to-send packet is transmitted to the AP at a current time during a current exchange based on the determination. Preferably, the poll is transmitted to the AP during the first duration.

Figure 10:
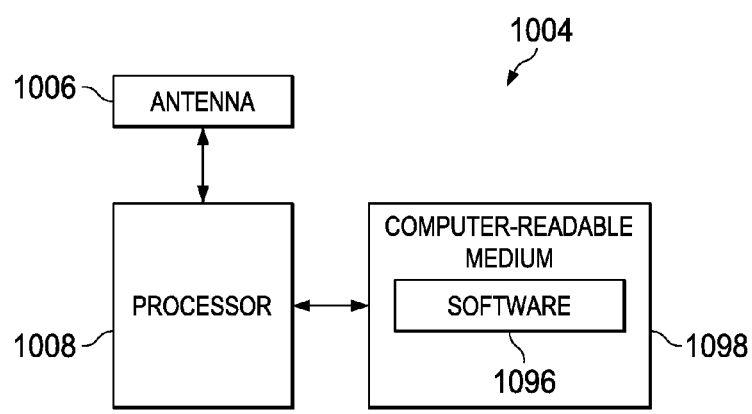
FIG. 10 illustrates a device in accordance with at least some illustrative embodiments.

FIG. 10 illustrates a device 1004. Preferably, the device 1004 comprises a computer-readable medium 1098 storing software 1096 that, when executed by a processor 1008, causes the processor 1008 to perform any of the steps described in this disclosure. Preferably, the device is a STA comprising a processor 1008, memory 1098 coupled to the processor, and an antenna 1006. The antenna 1006 transmits a current clear-to-send packet at a current time during a current exchange based on success or failure of a previous exchange during which a previous clear-to-send packet was transmitted at a previous time.

If the previous exchange was successful, the processor 1008 determines the current time to be later in the current exchange relative to the previous time in the previous exchange by a linear amount. If the previous exchange failed, the processor 1008 determines the current time to be earlier in the current exchange relative to the previous time in the previous exchange by an exponential amount. If there is no previous transmission, the antenna 1006 transmits the current clear-to-send packet at a second threshold.

The antenna 1006 sends and receives packets using a first protocol, and the antenna 1006 does not receive data packets without transmitting a poll. The antenna 1006 also sends and receives packets using a second protocol. The processor 1008 determines a first threshold before which the antenna 1006 uses the first protocol and after which the antenna 1006 uses the second protocol. The processor 1008 determines the second threshold, the second threshold before the first threshold, and the processor 1008 determines a first duration between the second threshold and the first threshold at least of sufficient length for the antenna to receive one data packet and send an acknowledgment. The antenna 1006 preferably transmits the poll to the AP during the first duration.

Other conditions and combinations of conditions will become apparent to those skilled in the art, including the combination of the conditions described above, and all such conditions and combinations are within the scope of the present disclosure. Additionally, audio or visual alerts may be triggered upon successful completion of any action described herein, upon unsuccessful actions described herein, and upon errors.

The above disclosure is meant to be illustrative of the principles and various embodiment of the present invention. Numerous variations and modifications will become apparent to those skilled in the art once the above disclosure is fully appreciated. Also, the order of the actions shown in FIG. 8 can be varied from order shown, and two or more of the actions may be performed concurrently. It is intended that the following claims be interpreted to embrace all variations and modifications.

What is claimed is:

1. A network, comprising:
    an access point communicating using a first protocol unable to transmit data packets without receiving a poll packet; and
    a station communicating using both the first protocol and a second protocol, wherein the station uses the first protocol before a first threshold and a second protocol after the first threshold and wherein a first duration between the second threshold and the first threshold is at least of sufficient length for the station to receive one data packet from the access point and send an acknowledgment, wherein the station transmits to the access point a current clear-to-send packet at a current time during a current exchange based on success or failure of a previous exchange during which a previous clear-to-send packet was transmitted to the access point at a previous time wherein the station transmits the poll packet to the access point during the first duration,
    wherein the station transmits the current clear-to-send packet, before transmitting the poll packet during the first duration,
    wherein the station receives an acknowledgement to the poll packet during the first duration,
    wherein a network allocation vector period of the current clear-to-send packet expires at a third threshold before which the station uses the second protocol and after which the station uses the first protocol, and
    wherein the third threshold is after the first threshold.

2. The network of claim 1, wherein if the previous exchange was successful, the current time is later in the current exchange relative to the previous time in the previous exchange, the current time linearly related to the previous time.

3. The network of claim 1, wherein if the previous exchange failed, the current time is earlier in the current exchange relative to the previous time in the previous exchange, the current time exponentially related to the previous time.

4. The network of claim 1, wherein the access point transmits a beacon to the station, the beacon indicating a data packet is available, and the access point transmits the data packet after the third threshold.

5. The network of claim 1, wherein the poll packet and the acknowledgement to the poll packet are sent during the network allocation vector period.

6. A method, comprising:
    determining if a previous exchange, during which a previous clear-to-send packet was transmitted to an access point at a previous time, between a station and the access point was successful; and
    transmitting a current clear-to-send packet, to the access point, at a current time during a current exchange based on the determination;
    wherein communication between the station and the access point occurs in a first protocol, the access point unable to transmit data packets to the station without receiving a poll packet,
    wherein the station also communicates using a second protocol, and
    wherein the station uses the first protocol before a first threshold and the second protocol after the first threshold, and wherein a first duration between the second threshold and the first threshold is at least of sufficient length for the station to receive one data packet from the access point and send an acknowledgment, if there is no previous transmission, transmitting the current clear-to-send packet at the second threshold, wherein the access point is unable to transmit data packets to the station without receiving a poll packet and wherein the second threshold is before the first threshold.

7. The method of claim 6, further comprising, if the previous exchange was successful, determining the current time to be later in the current exchange relative to the previous time in the previous exchange.

8. The method of claim 6, further comprising, if the previous exchange failed, determining the current time to be earlier in the current exchange relative to the previous time in the previous exchange.

9. The method of claim 6, further comprising transmitting the poll packet to the access point during the first duration.

10. A device, comprising:
    a processor;
    memory coupled to the processor; and
    an antenna which sends and receives packets using both a first protocol and a second protocol;
    wherein the antenna transmits a current clear-to-send packet at a current time during a current exchange based on success or failure of a previous exchange during which a previous clear-to-send packet was transmitted at a previous time wherein the processor determines a first threshold before which the antenna uses the first protocol and after which the antenna uses the second protocol,
    wherein if there is no previous transmission, the antenna transmits the current clear-to-send packet at the second threshold,
    wherein the antenna does not receive data packets without transmitting a poll packet, and
    wherein the processor determines the second threshold, the second threshold before the first threshold, a first duration between the second threshold and the first threshold at least of sufficient length for the antenna to receive one data packet and send an acknowledgment.

11. The device of claim 10, wherein if the previous exchange was successful, the processor determines the current time to be later in the current exchange relative to the previous time in the previous exchange by a linear amount.

12. The device of claim 10, wherein if the previous exchange failed, the processor determines the current time to be earlier in the current exchange relative to the previous time in the previous exchange by an exponential amount.

13. The device of claim 10, wherein the antenna transmits the poll packet to the access point during the first duration.

* * * * *